United States Patent [19]
Glover

[11] Patent Number: 6,101,227
[45] Date of Patent: Aug. 8, 2000

[54] DETECTOR AND METHOD FOR DETECTING DEFECTS IN THE MAGNETIC MEDIA OF A MASS STORAGE SYSTEM

[75] Inventor: Kerry C. Glover, Wylie, Tex.

[73] Assignee: Texas Instruments Incorporated, Dallas, Tex.

[21] Appl. No.: 08/839,886

[22] Filed: Apr. 16, 1997

Related U.S. Application Data

[60] Provisional application No. 60/015,828, Apr. 18, 1996.

[51] Int. Cl.[7] ....................................................... H03D 1/00
[52] U.S. Cl. .......................... 375/341; 375/262; 375/265; 714/795; 714/796
[58] Field of Search ................................ 360/65, 53, 51, 360/31, 45; 375/341, 345, 346, 262, 263, 264, 265; 371/43, 48; 177/1; 704/242; 714/786, 788, 791, 794, 795, 796

[56] References Cited

U.S. PATENT DOCUMENTS

| | | | |
|---|---|---|---|
| 4,509,608 | 4/1985 | Hikita .......................................... | 177/1 |
| 4,862,464 | 8/1989 | Betts et al. ................................. | 371/43 |
| 4,881,136 | 11/1989 | Shiraishi .................................... | 360/25 |
| 5,150,050 | 9/1992 | Genheimer ............................. | 324/212 |
| 5,341,387 | 8/1994 | Nguyen .................................... | 714/788 |
| 5,384,560 | 1/1995 | Yamasaki .............................. | 340/146.2 |
| 5,448,583 | 9/1995 | Miyamoto et al. ........................ | 371/43 |
| 5,737,141 | 4/1998 | Hardwick et al. ......................... | 360/45 |
| 5,862,157 | 1/1999 | Bessios ..................................... | 371/48 |

OTHER PUBLICATIONS

Lyle J. Fredrickson, "Viterbi Detection of Matched Spectral Null codes for PR4 Systems," *IEEE Transactions on Magnetics*, vol. 28, No. 5, Sep. 1992, pp. 2889–2891.

K. Chopra and D.D. Woods, "A Maximum Likelihood Peak Detecting Channel," *IEEE Transactions on Magnetics*, vol. 27, No. 6, Nov. 1991, pp. 4819–4821.

Arvind M. Patel, "A New Digital Processing Channel for Data Storage Products," *IEEE Transactions on Magnetics*, vol. 27, No. 6, Nov. 1991, pp. 4579–4584.

Richard C. Schneider, "Sequence (Viterbi–Equivalent) Decoding," *IEEE Transactions on Magnetics*, vol. 24, No. 6, Nov. 1988, pp. 2539–2541.

J.D. Coker, R.L. Galbraith, G.J. Kerwin, J.W. Rae, P.A. Ziperovich, "Implementation of PRML in a Rigid Disk Drive," *IEEE Transactions on Magnetics*, vol. 27, No. 6, Nov. 1991, pp. 4538–4543.

H. Kobayashi and D.T. Tang, "Application of Partial–response Channel Coding to Magnetic Recording Systems," *IBM J. Res. Develop.*, Jul. 1970, pp. 368–375.

Kenneth Abend and Bruce D. Fritchman, "Statistical Detection for Communication Channels with Intersymbol Interference," *Proceedings of the IEEE*, vol. 58, No. 5, May 1970, pp. 779–785.

(List continued on next page.)

*Primary Examiner*—Stephen Chin
*Assistant Examiner*—Chieh M. Fan
*Attorney, Agent, or Firm*—W. Daniel Swayze, Jr.; W. James Brady, III; Frederick J. Telecky, Jr.

[57] ABSTRACT

A detector and method for detecting defects in the magnetic media of a disk drive mass storage system (30) are provided. The detector may include a viterbi detector (54), having a metric circuit (53) and a trellis circuit (55), for use in a read channel (18) during read operations. Known data is originally written to a sector of the magnetic media of a disk/head assembly (12). The known data includes all binary "ones." The sector of known data is later read during a read operation. During this read operation, the read channel (18) receives an analog signal corresponding to the sector of known data. The metric circuit (53) receives a discrete, equalized signal from a finite impulse response filter (48) and provides a transition signal (56). The transition signal (56) is provided to a control circuitry (11) through a data/parameter path (13) after being placed in parallel format by a deserializer (60). A microprocessor (28) of the control circuitry (11) may process the transition signal (56) and determine which of the bits of the transition signal (56) are different from the original known data. Discrepancies indicate the existence and location of a defect in the magnetic media.

4 Claims, 2 Drawing Sheets

OTHER PUBLICATIONS

G. David Forney, Jr., "Maximum–Likelihood Sequence Estimation of Digital Sequences in the Presence of Intersymbol Interference," *IEEE Transactions on Information Theory,* vol. IT–18, No. 3, May 1972, pp. 363–378.

G. David Forney, Jr., "The Viterbi Algorithm," *Proceedings of the IEEE,* vol. 61, No. 3, Mar. 1973, pp. 268–278.

Gottfried Ungerboeck, "Adaptive Maximum–Likelihood Receiver for Carrier–Modulated Data–Transmission Systems," *IEEE Transactions on Communications,* vol. Com–22, No. 5, May 1974, pp. 624–636.

Peter Kabal and Subbarayan Pasupathy, "Partial–Response Signaling," *IEEE Transactions on Communications,* vol. Com–23, No. 9, Sep. 1975, pp. 921–934.

C.T. Beare, "The Choice of the Desired Impulse Response in Combined Linear–Viterbi Algorithm Equalizers," *IEEE Transactions on Communications,* vol. Com–26, No. 8, Aug. 1978, pp. 1301–1307.

R.A. Baugh, E.S. Murdock, and B.R. Natarajan, "Measurement of Noise in Magnetic Media," *IEEE Transactions on Magnetics,* vol. MAG–19, No. 5, Sep. 1983, pp. 1722–1724.

Hans Burkhardt and Lineu C. Barbosa, "Contributions to the Application of the Viterbi Algorithm," *IEEE Transactions on Information Theory,* vol. IT–31, No. 5, Sep. 1985, pp. 626–634.

Yaw–Shing Tang, "Noise Autocorrelation in Magnetic Recording Systems," *IEEE Transactions on Magnetics,* vol. MAG–21, No. 5, Sep. 1985, pp. 1389–1394.

Roger W. Wood and David A. Petersen, "Viterbi Detection of Class IV Partial Response on a Magnetic Recording Channel," *IEEE Transactions on Communications,* vol. COM–34, No. 5, May 1986, pp. 454–461.

Yaw–Shing Tang, "Noise Autocorrelatin in High Density Recording on Metal Film Disks," *IEEE Transactions on Magnetics,* vol. MAG–22, No. 5, Sep. 1986, pp. 883–885.

C. Michael Melas, Patrick Arnett, Irene Beardsley, and Dean Palmer, "Nonlinear Superposition in Saturation Recording of Disk Media," *IEEE Transactions on Magnetics,* vol. MAG–23, No. 5, Sep. 1987, pp. 2079–2081.

Dean Palmer, Pablo Ziperovich, Roger Wood, and Thomas D. Howell, "Identification of Nonlinear Write Effects Using Pseudorandom Sequences," *IEEE Transactions on Magnetics,* vol. MAG–23, No. 5, Sep. 1987, pp. 2377–2379.

Roger Wood, "Jitter vs. Additive Noise in Magnetic Recording: Effects on Detection," *IEEE Transactions on Magnetics,* vol. MAG–23, No. 5, Sep. 1987, pp. 2683–2685.

H.K. Thapar and A.M. Patel, "A Class of Partial Response Systems for Increasing Storage Density in Magnetic Recording," *IEEE Transactions on Magnetics,* vol. MAG–23, No. 5, Sep. 1987, pp. 3666–3668.

Yinyi Lin and Jack K. Wolf, "Combined ECC/RLL Codes," *IEEE Transactions on Magnetics,* vol. 24, No. 6, Nov. 1988, pp. 2527–2529.

Catherine A. French, Anthony D. Weathers, and Jack Keil Wolf, "A Generalized Scheme for Generating and Detecting Recording Channel Output Waveforms with Controlled Pulse Polarity," *IEEE Transactions on Magnetics,* vol. 24, No. 6, Nov. 1988, pp. 2530–2532.

Richard C. Schneider, "Write Equalization for Generalized (d,k) Codes," *IEEE Transactions on Magnetics,* vol. 24, No. 6, Nov. 1988, pp. 2533–2535.

Michael Melas, Patrick Arnett, and Jaekyun Moon, "Noise in a Thin Metallic Medium: The Connection with Nonlinear Behaviour," *IEEE Transactions on Magnetics,* vol. 24, No. 6, Nov. 1988, pp. 2712–2714.

Jaekyun J. Moon and L. Richard Carley, "Partial Response Signaling in a Magnetic Recording Channel," *IEEE Transactions on Magnetics,* vol. 24, No. 6, Nov. 1988, pp. 2973–2975.

F. Dollvo, R. Hermann, and S. Olcer, "Performance and Sensitivity Analysis of Maximum–Likelihood Sequence Detection on Magnetic Recording Channels," *IEEE Transactions on Magnetics,* vol. 25, No. 5, Sep. 1989, pp. 4072–4074.

Roger Wood, "New Detector for 1,k Codes Equalized to Class II Partial Response," *IEEE Transactions on Magnetics,* vol. 25, No. 5, Sep. 1989, pp. 4075–4077.

J.W.M. Bergmans, S. Mita, and M. Izumita, "Characterization of Digital Recording Channels by Means of Echo Cancellation Techniques," *IEEE Transactions on Magnetics,* vol. 25, No. 5, Sep. 1989, pp. 4078–4080.

Yinyi Lin, "An Estimation Technique for Accurately Modelling the Magnetic Recording Channel Including Nonlinearities," *IEEE Transactions on Magnetics,* vol. 25, No. 5, Sep. 1989, pp. 4084–4086.

Anthony D. Weathers, Catherine A. French, and Jack Keil Wolf, "Results on 'Controlled Polarity' Modulation and Coding," *IEEE Transactions on Magnetics,* vol. 25, No. 5, Sep. 1989, pp. 4090–4092.

Catherine A. French, "Distance Preserving Run–Length Limited Codes," *IEEE Transactions on Magnetics,* vol. 25, No. 5, Sep. 1989, pp. 4093–4095.

Lyle J. Fredrickson and Jack Keil Wolf, "Error Detecting Multiple Block (d,k) Codes," *IEEE Transactions on Magnetics,* vol. 25, No. 5, Sep. 1989, pp. 4096–4098.

Roger Wood, "Enhanced Decision Feedback Equalization," *IEEE Transactions on Magnetics,* vol. 26, No. 5, Sep. 1990, pp. 2178–2180.

Thomas D. Howell, Donald P. McCown, Thomas A. Diola, Yaw–shing Tang, Karl R. Hense, Ralph L. Gee, "Error Rate Performance of Experimental Gigabit Per Square Inch Recording Components," *IEEE Transactions on Magnetics,* vol. 26, No. 5, Sep. 1990, pp. 2298–2302.

Pantas Sutardja, "A Post–Compensation Scheme for Peak–Detect Channel," *IEEE Transactions on Magnetics,* vol. 26, No. 5, Sep. 1990, pp. 2303–2305.

L.L. Nunnelley, M.A. Burleson, L.L. Williams, and I.A. Beardsley, "Analysis of Asymmetric Deterministic Bitshift Errors in a Hard Disk File," *IEEE Transactions on Magnetics,* vol. 26, No. 5, Sep. 1990, pp. 2306–2308.

H.K. Thapar, N.P.Sands, W.L. Abbott, and J.M. Cioffi, "Spectral Shaping for Peak Detection Equalization," *IEEE Transactions on Magnetics,* vol. 26, No. 5, Sep. 1990, pp. 2309–2311.

Lyle J. Fredrickson, "Coding for Maximum Likelihood Detection on a Magnetic Recording Channel," *IEEE Transactions on Magnetics,* vol. 26, No. 5, Sep. 1990, pp. 2315–2317.

Lyle J. Fredrickson, "A (D,K,C)=(0,3,5/2) Rate 8/10 Modulation Code," *IEEE Transactions on Magnetics,* vol. 26, No. 5, Sep. 1990, pp. 2318–2320.

R. Hermann, "Volterra Modeling of Digital Magnetic Saturation Recording Channels," *IEEE Transactions on Magnetics,* vol. 26, No. 5, Sep. 1990, pp. 2125–2127.

Roger Wood, Mason Williams, and John Hong, "Considerations for High Data Rate Recording with Thin–Film Heads," *IEEE Transactions on Magnetics,* vol. 26, No. 6, Nov. 1990, pp. 2954–2959.

Jaekyun Moon and L. Richard Carley, "Performance Comparison of Detection Methods in Magnetic Recording," *IEEE Transactions on Magnetics,* vol. 26, No. 6, Nov. 1990, pp. 3155–3172.

William L. Abbott, John M. Cioffi, and Hermant K. Thapar, "Performance of Digital Magnetic Recording with Equalization and Offtrack Interference," *IEEE Transactions on Magnetics,* vol. 27, No. 1, Jan. 1991, pp. 705–716.

Jan W.M. Bergmans, Seiichi Mita, and Morishi Izumita, "A Simulation Study of Adaptive Reception Schemes for High–Density Digital Magnetic Storage," *IEEE Transactions on Magnetics,* vol. 27, No. 1, Jan. 1991, pp. 717–723.

Ching Tsang and Yaw–Shing Tang, "Time–Domain Study of Proximity–Effect Induced Transition Shifts," *IEEE Transactions on Magnetics,* vol. 27, No. 2, Mar. 1991, pp. 795–802.

K.B. Klaassen, "Magnetic Recording Channel Front–Ends," *IEEE Transactions on Magnetics,* vol. 27, No. 6, Nov. 1991, pp. 4503–4508.

John Hong, Roger Wood, David Chan, "An Experimental 180 Mb/sec PRML Channel for Magnetic Recording," *IEEE Transactions on Magnetics,* vol. 27, No. 6, Nov. 1991, pp. 4532–4537.

Jonathan D. Coker, Richard L., Galbraith, and Gregory J. Kerwin, "Magnetic Characterization using Elements of a PRML Channel," *IEEE Transactions on Magnetics,* vol. 27, No. 6, Nov. 1991, pp. 4544–4548.

L. Richard Carley and John G. Kenney, "Comparison of Computationally Efficient Forms of FDTS/DF Against PR4–ML," *IEEE Transactions on Magnetics,* vol. 27, No. 6, Nov. 1991, pp. 4567–4572.

Jaekyun Moon, "Discrete–Time Modeling of Transition–Noise Dominant Channels and Study of Detection Performance," *IEEE Transactions on Magnetics,* vol. 27, No. 6, Nov. 1991, pp. 4573–4578.

Jack Keil Wolf, "A Survey of Codes for Partial Response Channels," *IEEE Transactions on Magnetics,* vol. 27, No. 6, Nov. 1991, pp. 4585–4589.

Norman L. Koren, "Matched Filter Limits and Code Performance in Digital Magnetic Recording," *IEEE Transactions on Magnetics,* vol. 27, No. 6, Nov. 1991, pp. 4594–4599.

H.M. Hilden, D.G. Howe, and E.J. Weldon, Jr., "Shift Error Correcting Modulation Codes," *IEEE Transactions on Magnetics,* vol. 27, No. 6, Nov. 1991, pp. 4600–4605.

Derek D. Kumar and Bill J. Hunsinger, "ACT–enabled 100MHz Channel Equalizer," *IEEE Transactions on Magnetics,* vol. 27, No. 6, Nov. 1991, pp. 4799–4803.

Alan J. Armstrong and Jack Keil Wolf, "Performance Evaluation of a New Coding Scheme for the Peak Detecting Magnetic Recording Channel," *IEEE Transactions on Magnetics,* vol. 27, No. 6, Nov. 1991, pp. 4804–4806.

S. Raghavan and H.K. Thapar, "Feed–Forward Timing Recovery for Digital Magnetic Recording," *International Conference on Communications Conference Record,* vol. 2, 1991, pp. 794–798.

S.A. Raghavan and H.K. Thapar, "On Feed–Forward and Feedback Timing Recovery for Digital Magnetic Recording Systems," *IEEE Transactions on Magnetics,* vol. 27, No. 6, Nov. 1991, pp. 4810–4812.

James Fitzpatrick and Jack Keil Wolf, "A Maximum Likelihood Detector for Nonlinear Magnetic Recording," *IEEE Transactions on Magnetics,* vol. 27, No. 6, Nov. 1991, pp. 4816–4818.

John G. Kenney, Peter Alexis McEwen, and L. Richard Carley, "Evaluation of Magnetic Recording Detection Schemes for Thin Film Media," *IEEE Transactions on Magnetics,* vol. 27, No. 6, Nov. 1991, pp. 4822–4824.

Pablo A. Ziperovich, "Performance Degradation of PRML Channels Due to Nonlinear Distortions," *IEEE Transactions on Magnetics,* vol. 27, No. 6, Nov. 1991, pp. 4825–4827.

Jaekyun Moon and Jian–Gang Zhu, "Nonlinear Effects of Transition Broadening," *IEEE Transactions on Magnetics,* vol. 27, No. 6, Nov. 1991, pp. 4831–4833.

Jaekyun Moon, "Signal–to–Noise Ratio Degradation with Channel Mismatch," *IEEE Transactions on Magnetics,* vol. 27, No. 6, Nov. 1991, pp. 4837–4839.

R.D. Barndt, A.J. Armstrong, H.N. Bertram, and J.K. Wolf, "A Simple Statistical Model of Partial Erasure in Thin Film Disk Recording Systems," *IEEE Transactions on Magnetics,* vol. 27, No. 6, Nov. 1991, pp. 4978–4980.

Y. Tang and C. Tsang, "A Technique for Measuring Nonlinear Bit Shift," *IEEE Transactions on Magnetics,* vol. 27, No. 6, Nov. 1991, pp. 5316–5318.

R.D. Barndt and J.K. Wolf, "Modeling and Signal Processing for the Nonlinear Thin Film Recording Channel," *IEEE Transactions on Magnetics,* vol. 28, No. 5, Sep. 1992, pp. 2710–2712.

H. Thapar, J. Rae, C. Shung, R. Karabed, and P. Siegel, "On the Performance of a Rate 8/10 Matched Spectral Null Code for Class–4 Partial Response," *IEEE Transactions on Magnetics,* vol. 28, No. 5, Sep. 1992, pp. 2883–2888.

Hamid Shafiee and Jaekyun Moon, "Low–Complexity Viterbi Detection for a Family of Partial Response Systems†," *IEEE Transactions on Magnetics,* vol. 28, No. 5, Sep. 1992, pp. 2892–2894.

Weining Zeng and Jaekyun Moon, "Modified Viterbi Algorithm for a Jitter–dominant $1-D^2$ Channel," *IEEE Transactions on Magnetics,* vol. 28, No. 5, Sep. 1992, pp. 2895–2897.

William E. Ryan, "Comparative Performance Between Drop–Out Detection and Viterbi Reliability Metric Erasure Flagging," *IEEE Transactions on Magnetics,* vol. 28, No. 5, Sep. 1992, pp. 2898–2900.

C. Menyennett, L. Botha, and H.C. Ferreira, "A NewRunlength Limited Code for Binary Asymmetric Channels," *IEEE Transactions on Magnetics,* vol. 28, No. 5, Sep. 1992, pp. 2901–2903.

Gang H. Lin, Rick Barndt, H. Neal Bertram, and Jack K. Wolf, "Experimental Studies of Nonlinearities in High Density Disk Recording," *IEEE Transactions on Magnetics,* vol. 28, No. 5, Sep. 1992, pp. 3279–3281.

Ralph Simmons and Robert Davidson, "Media Design for User Density of up to 3 Bits per Pulse Width," *IEEE Transactions on Magnetics,* vol. 29, No. 1, Jan. 1993, pp. 169–176.

Jaekyun Moon and Jian–Gang Zhu, "Nonlinearities in Thin–Film Media and Their Impact on Data Recovery," *IEEE Transactions on Magnetics,* vol. 29, No. 1, Jan. 1993, pp. 177–182.

R.D. Barndt, A.J. Armstrong, and J.K. Wolf, "Media Selection for High Density Recording Channels," *IEEE Transactions on Magnetics,* vol. 29, No. 1, Jan. 1993, pp. 183–188.

Dean C. Palmer and Jonathan D. Coker, "Media Design Considerations for a PRML Channel," *IEEE Transactions on Magnetics,* vol. 29, No. 1, Jan. 1993, pp. 189–194.

Zadian Software, Inc., *Disk Drive Technology,* Copyright 1990, San Jose, CA.

United States Patent Application for "System and Method for Reconstructing a Signal Wave in a Partial Response Read Channel," 32 pages of text and 8 figures. (Serial No. and filing date is unknown.)

Roy D. Cideciyan, Francois Dolivo, Reto Hermann, Walter Hirt, and Wolfgang Schott, "A PRML System for Digital Magnetic Recording," *IEEE Journal on Selected Areas in Communications,* vol. 10, No. 1, Jan. 1992, pp. 38–56.

DETECTOR AND METHOD FOR DETECTING DEFECTS IN THE MAGNETIC MEDIA OF A MASS STORAGE SYSTEM

This application claims priority under 35 USC § 119(e)(1) provisional application No. 60/015,828, filed Apr. 18, 1996.

TECHNICAL FIELD OF THE INVENTION

This invention relates generally to the field of information storage and more particularly to a detector and method for detecting defects in the magnetic media of a mass storage system.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space. An axiom in the computer industry is that there is no such thing as enough memory and disk storage space.

To meet these ever increasing demands, hard disk drives continue to evolve and advance. Some of the early disk drives had a maximum storage capacity of five megabytes and used fourteen inch platters, whereas today's hard disk drives are commonly over one gigabyte and use 3.5 inch platters. Correspondingly, advances in the amount of data stored per unit of area, or areal density, have dramatically accelerated. For example, in the 1980's, areal density increased about thirty percent per year while in the 1990's annual areal density increases have been around sixty percent. The cost per megabyte of a hard disk drive is inversely related to its areal density.

Mass storage device manufacturers strive to produce high speed hard disk drives with large data capacities at lower and lower costs. A high speed hard disk drive is one that can store and retrieve data at a fast rate. One aspect of increasing disk drive speed and capacity is to improve or increase the areal density. Areal density may be increased by improving the method of storing and retrieving data.

In general, mass storage devices and systems, such as hard disk drives, include a magnetic storage media, such as rotating disks or platters, a spindle motor, read/write heads, an actuator, a pre-amplifier, a read channel, a write channel, a servo controller, and control circuitry to control the operation of the hard disk drive and to properly interface the hard disk drive to a host or system bus. The read channel, write channel, servo controller, and a memory may all be implemented as one integrated circuit that is referred to as a data channel. The control circuitry often includes a microprocessor for executing control programs or instructions during the operation of the hard disk drive.

A hard disk drive (HDD) performs write and read operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The control circuitry moves the read/write heads to the appropriate track and locates the appropriate sector of the track. Finally, the HDD control circuitry transfers the data from the DRAM to the located sector of the disk platter through the write channel. A sector generally has a fixed data storage capacity, such as 512 bytes of user data per sector. A write clock controls the timing of a write operation in the write channel. The write channel may encode the data so that the data can be more reliably retrieved later.

In a read operation, the appropriate sector to be read is located and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM of the control circuitry. The processor then communicates to the host that data is ready to be transferred. A read clock controls the timing of a read operation in the read channel.

As the disk platters are moving, the read/write heads must align or stay on a particular track. This is accomplished by reading information from the disk called a servo wedge. Generally, each sector has a corresponding servo wedge. The servo wedge indicates the position of the heads. The data channel receives this position information so the servo controller can continue to properly position the heads on the track.

Traditional HDD data or read channels used a technique known as peak detection for extracting or detecting digital information from the analog information stored on the magnetic media. In this technique, the waveform is level detected and if the waveform level is above a threshold during a sampling window, the data is considered a "one." More recently, advanced techniques utilizing discrete time signal processing (DTSP) to reconstruct the original data written to the disk are being used in read channel electronics to improve areal density. In these techniques, the data is synchronously sampled using a data recovery clock. The sample is then processed through a series of mathematical manipulations using signal processing theory.

There are several types of synchronously sampled data (SSD) channels. Partial response, maximum likelihood (PRML); extended PRML (EPRML); enhanced, extended PRML (EEPRML); fixed delay tree search (FDTS); and decision feedback equalization (DFE) are several examples of different types of SSD channels using DTSP techniques. The maximum likelihood detection performed in many of these systems is usually performed by a Viterbi decoder implementing the Viterbi algorithm, named after Andrew Viterbi who developed it in 1967.

The SSD channel or read channel generally requires mixed-mode circuitry for performing a read operation. The circuitry may perform such functions as analog signal amplification, automatic gain control (AGC), continuous time filtering, signal sampling, DTSP manipulation, timing recovery, signal detection, and formatting. In all SSD channels, the major goal during a read operation is to accurately retrieve the data with the lowest bit error rate (BER) in the highest noise environment. The data channel circuitry, including both a read channel and a write channel, may be implemented on a single integrated circuit package that contains various input and output (I/O) pins.

The detectors used in SSD channels receive a read signal and detect "zeros" and "ones" from the signal. In performing this detection, a detector analyzes the read signal and may appear to correct data error conditions caused by defects or problems in the disk or magnetic medium. Because the detector masks some of these data errors, the severity and exact location of the defects cannot be determined. When different data patterns are written to the disk, the defective location may cause actual HDD data errors. If these defective locations were known, certain disk sectors or areas may be mapped out or corrected to reduce the possibility of data errors, thus increasing overall HDD performance.

Quality control problems in disk media also go undetected when magnetic defects in the disk are present at the time of manufacture but are not detected because the SSD channel detector masks any data errors that may be caused by such defects. These magnetic defects may worsen and present problems as the disk media ages. The ability to determine the location and severity of such defects would assist with quality control.

SUMMARY OF THE INVENTION

From the foregoing it may be appreciated that a need has arisen for a detector and method for detecting defects in the magnetic media of a mass storage system. In accordance with the present invention, a. detector and method is provided that allows for a transition signal to be provided from a synchronously sampled data channel before sequence detection techniques are used to mask any data errors that may be caused by defects in the magnetic storage medium. A known data signal is first written to a sector or location on the magnetic media. This known data is later read from the magnetic media and processed in a read channel. During the read operation, a metric circuit of a detector provides the transition signal to control circuitry. The transition signal may be provided to control circuitry through the same data. path that is used to provide data to the control circuitry during a normal read operation. The transition signal reveals the existence and location of any defects in the magnetic media of the mass storage system.

According to the present invention, a detector for use in a synchronously sampled data channel of a mass storage system is provided for detecting data during read operations. The mass storage system includes a storage medium, a data channel, and a control circuitry for controlling the operation of the mass storage system. The detector includes a metric circuit and a trellis circuit. The metric circuit receives a discrete, equalized signal and calculates a transition signal that may be provided external to the detector so that the existence and location of defects may be determined. The trellis circuit receives the transition signal and performs sequence decoding to provide a digital output signal.

The present invention provides various technical advantages. A technical advantage of the present invention includes the ability to detect the location and severity of defects or flaws in the magnetic storage medium. Another technical advantage of the present invention involves the use of existing circuitry, in conjunction with additional circuitry, to provide a transition signal to control circuitry using minimal additional circuitry. The minimization of additional circuitry reduces fabrication costs and reduces overall power consumption. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
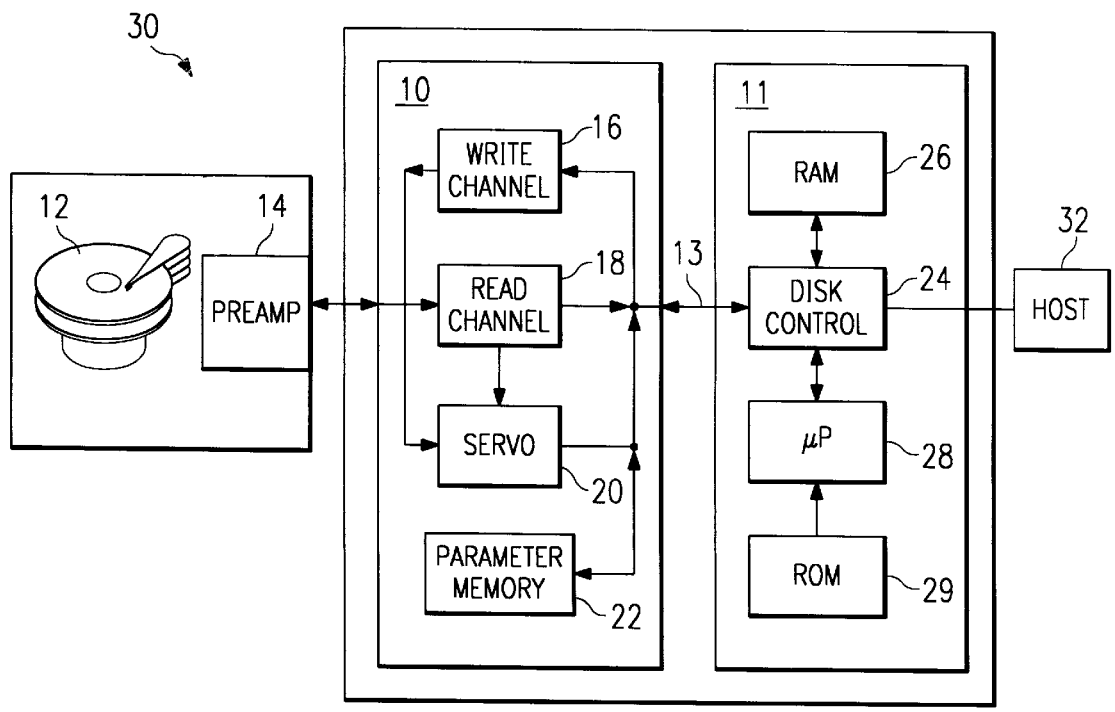
FIG. 1 is a block diagram illustrating a disk drive mass storage system.

FIG. 1 is a block diagram of a disk drive mass storage system 30 used for retrieving data during read operations and for storing data during write operations. Disk drive mass storage system 30 interfaces and exchanges data with a host 32 during read and write operations. Disk drive mass storage system 30 includes a disk/head assembly 12, a preamplifier 14, a synchronously sampled data (SSD) channel 10, and a control circuitry 11. Disk/head assembly 12 and preamplifier 14 are used to magnetically store data. SSD channel 10 and control circuitry 11 are used to process data that is being read from and written to disk/head assembly 12 and to control the various operations of disk drive mass storage system 30. Host 32 exchanges digital data with control circuitry 11.

Disk/head assembly 12 includes a number of rotating magnetic disks or platters used to store data that is represented as magnetic transitions on the magnetic platters. The read/write heads of disk/head assembly 12 are used to store and retrieve data from each side of the magnetic platters. The read/write heads may be any number of available read/write heads such as magneto-resistive heads. Preamplifier 14 interfaces between the read/write heads of disk/head assembly 12 and SSD channel 10 and provides amplification to the waveform data signals as needed.

SSD channel 10 is used during read and write operations to exchange analog data signals with disk/head assembly 12 through preamplifier 14 and to exchange digital data signals with control circuitry 11 through a data/parameter path 13. SSD channel 10 includes a write channel 16, a read channel 18, a servo control 20, and a parameter memory 22. SSD channel 10 may be implemented as a single integrated circuit.

During write operations, write channel 16 receives digital data from control circuitry 11 in parallel format through data/parameter path 13. The digital data is reformatted or coded for storage and provided to disk/head assembly 12. Write channel 16 may include a register, a scrambler, a phase locked loop, an encoder, a serializer, and a write precompensation circuit. The operation and timing of write channel 16 is controlled by a write clock signal.

During read operations, read channel 18 receives analog data signals from disk/head assembly 12 through preamplifier 14. Read channel 18 conditions, decodes, and formats the analog data signal and provides a digital data signal in parallel format to control circuitry 11 through data/parameter path 13. Read channel 18 includes any of a variety of circuit modules such as an automatic gain control circuit, a low pass filter, a variable frequency oscillator, a sampler, an equalizer, such as a finite impulse response filter, a maximum likelihood, partial response detector, a deserializer, and a synchronization field detection circuit. The operation of read channel 18 is described more fully below in the description of FIG. 2.

Some of the various circuit modules of read channel 18 may receive operational parameters for enhanced or optimal performance. The operational parameters are generally calculated during burn-in but may be calculated at other times. The operational parameters are designed to account for the various physical and magnetic characteristics of disk drive mass storage system 30 that vary from system to system and influence. operational performance. During start-up, the operational parameters are provided to SSD channel 10 from control circuitry 11 through data/parameter path 13. Parameter memory 22 stores the operational parameters. The various circuit modules of read channel 18 may then access the operational parameters from parameter memory 22 during read operations.

Servo control 20 provides position error signals (PES) to control circuitry 11 during read and write operations. The PES relate to the position of the heads of disk/head assembly 12 so that the heads can be properly positioned during both read and write operations.

Control circuitry 11 is used to control the various operations of disk drive mass storage system 30 and to exchange digital data with SSD channel 10 and host 32. Control circuitry 11 includes a microprocessor 28, a disk control 24, a random access memory (RAM) 26, and a read only memory (ROM) 29. Microprocessor 28, disk control 24, RAM 26, and ROM 29 together provide control and logic functions to disk drive mass storage system 30 so that data may be received from host 32, stored, and later retrieved and provided back to host 32. ROM 29 includes preloaded microprocessor instructions for use by microprocessor 28 in operating and controlling disk drive mass storage system 30. ROM 29 may also include the operational parameters, discussed above, that are supplied to parameter memory 22 during start-up. RAM 26 is used for storing digital data received from host 32 before being supplied to SSD channel 10 and received from SSD channel 10 before being supplied to host 32. RAM 26 may also provide data to microprocessor 28 and store data or results calculated by microprocessor 28. Disk control 24 includes various logic and bus arbitration circuitry used in properly interfacing disk drive mass storage system 30 to host 32 and for internally interfacing control circuitry 11 to SSD channel 10. Depending on the circuit implementation, any of a variety of circuitry may be used in disk control 24.

In operation, disk drive mass storage system 30 goes through an initialization or start-up routine when power is initially provided. One such routine instructs microprocessor 28 to supply operational parameters, previously stored in ROM 29, to parameter memory 22 of SSD channel 10 through data/parameter path 13. The operational parameters are then stored in memory registers of parameter memory 22 for use by read channel 18 during a read operation.

After the initialization routine is complete, data may be read from or written to disk/head assembly 12. Servo control 20 provides location information so that the read/write heads may be properly positioned on the disks to read and write data. In general, the operation of disk drive mass storage system 30 may be divided into read operations and non-read operations. Read operations involve the reading of data from the disks of disk head assembly 12 and non-read operations include write operations, servo operations, and times when the system is idle. Clock signals control both read operations and nonread operations.

During a read operation, host 32 initiates a request for data. After the read/write heads of disk/head assembly 12 are properly positioned, an analog data signal is provided to preamplifier 14. Read channel 18 receives the analog data signal from preamplifier 14, processes the analog data signal, and provides a corresponding digital data signal. This involves using various circuitry modules and techniques for synchronously sampling the analog data signal and detecting a digital signal. A read clock signal ensures that the data signal is synchronously sampled in the correct manner. Read channel 18 provides the digital data signal to disk control 24 through data/parameter path 13. Disk control 24 provides various digital logic control and arbitration circuitry between SSD channel 10, host 32, RAM 26, microprocessor 28, and ROM 29 during both read and write operations. The digital data is then stored in RAM 26 until microprocessor 28 communicates to host 32 that the data is ready to be transferred. Host 32 may be a system bus such as the system bus of a personal computer.

During a write operation, a digital data signal is received from host 32 and ultimately stored on disk/head assembly 12. Digital data is initially provided from host 32 to control circuitry 11. Control circuitry 11 stores the digital data in RAM 26. Microprocessor 28 schedules a series of events so that the data may then be transferred from RAM 26 to disk/head assembly 12, through write channel 16. This data exchange occurs through data/parameter path 13. RAM 26 first provides the data to write channel 16. Write channel 16 encodes the digital data and places the data in serial format. Write channel 16 then provides the data to disk/head assembly 12 after the heads of disk/head assembly 12 have been properly positioned to write or store the data at an appropriate location on the disk. The operation and timing of write channel 16 is controlled by a write clock signal.

Figure 2:
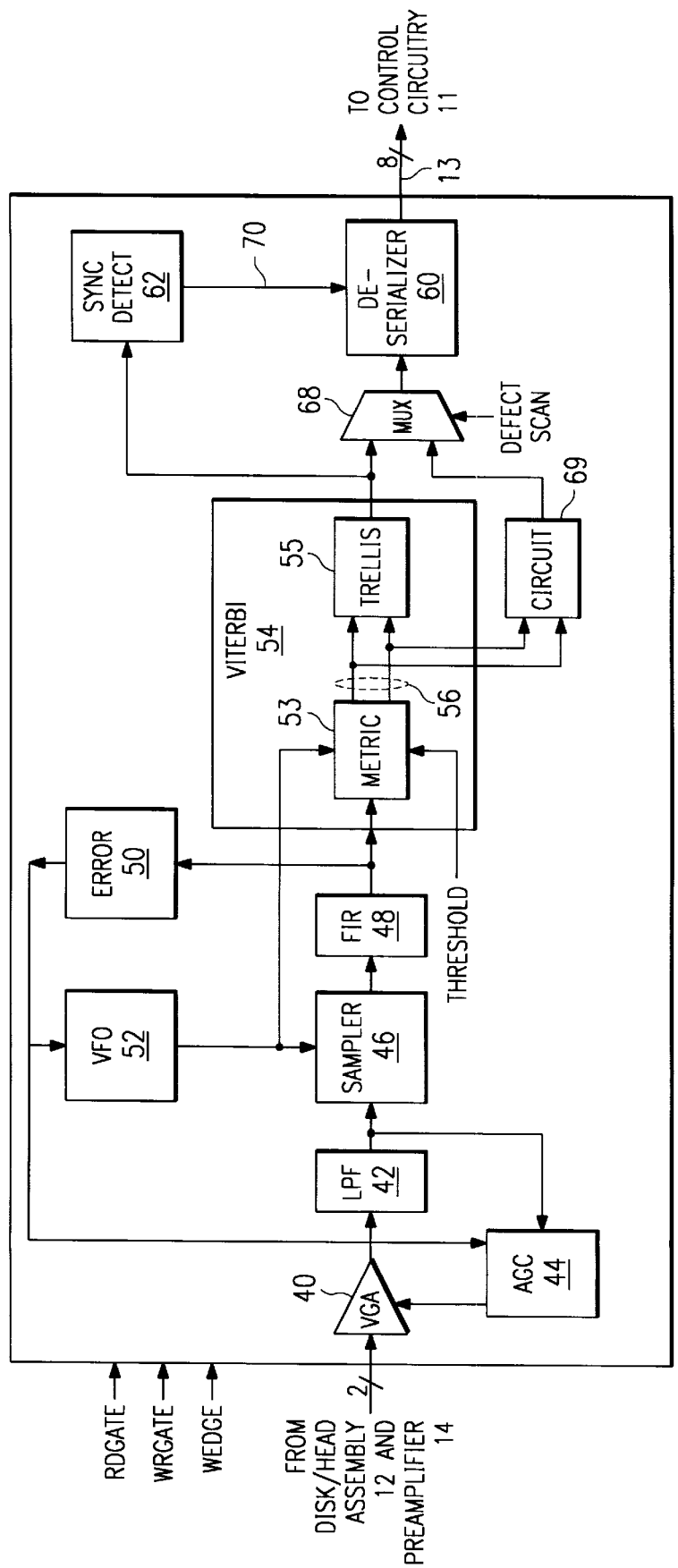
FIG. 2 is a block diagram illustrating the read channel of the disk drive mass storage system.

FIG. 2 is a block diagram of read channel 18 of disk drive mass storage system 30. Read channel 18 includes a variety of circuit modules used to process and condition an analog read signal received from a preamplifier 14 and a disk/head assembly 12 during a read operation. The circuit modules of read channel 18 include a variable gain amplifier (VGA) 40, an automatic gain control circuit (AGC) 44, a low pass filter (LPF) 42, a sampler 46, a finite impulse response filter (FIR) 48, a viterbi detector 54, a synchronization detect circuit (sync detect) 62, a deserializer 60, an error circuit 50, a variable frequency oscillator (VFO) 52, and a multiplexer 68. All of these circuit modules are used during a read operation to perform various functions to condition the analog read signal so that a corresponding digital data signal is provided at data/parameter path 13. The digital data is then supplied to control circuitry 11 and ultimately to a host system.

During a read operation, read channel 18 may be operated in one of two modes of operation, normal mode or defect scan mode. As discussed more fully below, defect scan mode involves providing a transition signal 56 from viterbi detector 54 such that multiplexer 68 provides transition signal 56 to deserializer 60 which then provides transition signal 56 to data/parameter path 13. Transition signal 56 may then be analyzed by processing circuitry, such as microprocessor 28 of FIG. 1, to determine if defects may be present in the magnetic storage medium of disk/head assembly 12.

The combination or subcombination of all of the circuit modules of read channel 18 may be referred to as a read channel processing circuit. The signals RDGATE, WRGATE, and WEDGE of FIG. 2, and other control signals not shown in FIG. 2, are supplied to read channel 18 and may be accessed by the various circuit modules of read channel 18 as needed. A read operation is performed in read channel 18 when the RDGATE signal is enabled. The WRGATE is enabled when a write operation is to be performed in the mass storage system, and the WEDGE signal is enabled when a servo wedge operation is to be performed. The various control signals control such things as whether read channel 18 is operating in the normal read mode or in the defect scan mode during a read operation.

During a read operation, while read channel 18 is in either normal mode or defect scan mode, VGA 40 receives an analog data signal or read signal from preamplifier 14 that originates from disk/head assembly 12. VGA 40, along with AGC 44, work together to provide an appropriate amplification to the analog data signal as needed by read channel 18. AGC 44 receives feedback information from error circuit 50 so that appropriate adjustments can be made in the amplification or gain provided to the analog data signal by VGA 40. Error circuit 50 provides an analog error signal to AGC 44 during sampled or discrete time signal processing. This analog error signal serves as an input to AGC 44 to assist with establishing the gain of VGA 40.

VGA 40 provides an amplified analog data signal. to LPF 42 for further processing in read channel 18. LPF 42 receives the amplified analog data signal and filters the signal to remove unwanted high frequency noise. LPF 42 also provides waveform shaping and amplitude boost. LPF 42 may be a continuous time 7the order filter designed using Gm/C components that may be operated in a data mode and a servo mode. The cutoff frequency and boost of LPF 42 may be programmable. The filtered output signal of LPF 42 is provided to sampler 46.

Sampler 46 receives the filtered output signal and synchronously samples the continuous time signal at discrete times and holds or provides the sampled value until the next sample time. VFO 52 controls sampler 46 by providing a clock signal indicating when sampler 46 should sample and hold the signal. The output of sampler 46 is a discrete, analog signal having discrete values. Each discrete value corresponds to the value or amplitude of the filtered output signal at the time the signal was sampled by sampler 46. Sampler 46 may be a sample and hold circuit such as a circular sample and hold circuit that is time sequence multiplexed to FIR 48 so that the correct time sequenced value is presented to FIR 48.

FIR 48 receives the discrete, analog signal from sampler 46 and provides a discrete, equalized signal that is equalized to the target function of viterbi detector 54. FIR 48 may employ a plurality of filter coefficients or taps to filter the signal. FIR 48 includes a plurality of multipliers that each receive one of the filter coefficients and a consecutive one of the discrete values provided from the discrete, analog signal of sampler 46. The outputs of each of the multipliers are then provided to an adder, such as an analog adder circuit, which sums these values and serves as the output of FIR 48. As the discrete, analog input signal changes, the consecutive one of the discrete values are shifted from one multiplier to the next multiplier so that the first multiplier receives the latest discrete value and the last multiplier loses the oldest discrete value and receives the next oldest discrete value.

FIR 48 may be a five tap filter with coefficients set by programmable digital circuitry. For example, FIR 48 may receive five digital coefficients or filter tap weights that are converted to an analog value through a digital-to-analog converter. Each coefficient is then provided to a separate multiplier. The coefficients may be stored in parameter memory 22 as shown in FIG. 1. The outputs of all five of the multipliers are provided to an analog adder circuit which provides the discrete, equalized signal as the output of FIR 48. The number of coefficients or taps and corresponding multipliers may vary. FIR 48 provides the discrete, equalized signal to viterbi detector 54 and error circuit 50.

Error circuit 50 receives the discrete, equalized signal provided by FIR 48 and provides an error signal. The error signal serves as an input to VFO 52 and AGC 44. The error signal indicates how far the discrete values of the discrete, equalized signal differ from an ideal target value. Error circuit 50 includes comparators or equivalent circuitry to compare the discrete values of the discrete, equalized signal to various ideal target values and threshold values.

VFO 52 receives the error signal from error circuit 50 during a read operation and provides a clock signal to sampler 46 and metric circuit 53 of viterbi detector 54. VFO 52 also receives a reference clock signal, such as a crystal signal, not shown in FIG. 2. The clock signal controls the sample time or sample intervals of sampler 46 and serves as a timing signal to metric circuit 53. During a read operation, VFO 52 receives the error signal and adjusts the frequency of its output clock signal an amount corresponding to the error signal. VFO 52, sampler 46, FIR 48, and error circuit 50 together provide a sampled time phase locked loop function to read channel 18. The clock signal provided by VFO 52 may be accessed by the various circuitry throughout read channel 18 as needed.

Viterbi detector 54 receives the discrete, equalized signal from FIR 48 and analyzes the signal to produce a digital data output signal corresponding to the data stored on disk/head assembly 12. Viterbi detector 54 includes a metric circuit 53 and a trellis circuit 55. When read channel 18 is operating in the defect scan mode, a transition signal 56, supplied by metric circuit 53, is combined into one signal using a selection circuitry 69 and then provided to a multiplexer 68 and ultimately to control circuitry 11 through data/parameter path 13. Selection circuitry 69 may be an AND gate, an OR gate, a multiplexer, or any needed digital circuitry. Transition signal 56 may then be analyzed to determine if defects are present in the magnetic storage medium of disk/head assembly 12. Trellis circuit 55 also receives transition signal 56 and provides the digital data output signal of viterbi detector 54 in response. The digital data output signal is then provided to multiplexer 68. When read channel 18 operates in normal mode, trellis circuit 55 provides the digital data output signal to multiplexer 68 and ultimately to control circuitry 11 through data/parameter path 13.

Viterbi detector 54 may include more than one metric and trellis circuit, such as an even and odd interleave circuit. Depending on the partial response or characteristic desired in synchronously sampled read channel 18, the discrete, equalized signal may be deinterleaved and analyzed by viterbi detector 54 as an odd and an even interleave signal. For example, if read channel 18 is implemented as a partial response, class IV (PR4) or duobinary, dicode read channel, viterbi detector 54 must analyze an odd and an even interleave signal of the discrete, equalized signal provided by FIR 48. When more than one metric circuit and trellis circuit are needed, the discrete, equalized signal from FIR 48 is sampled at alternating intervals to provide an odd and even discrete, equalized signal that is analyzed by the odd metric and trellis circuits and the even metric and trellis circuits. In this case, the signals must be properly interleaved so that the digital data output signal can be provided.

Viterbi detector 54 is a maximum likelihood detector or Viterbi decoder implementing the Viterbi algorithm for analyzing the partial response signal provided by the discrete, equalized signal of FIR 48 and to provide the digital data as an output signal. In performing maximum likelihood detection, the viterbi algorithm provides an iterative method for determining the best path along branches of a trellis diagram. The maximum likelihood detection involves analyzing a number of consecutive data samples to determine the most likely path. Thus, by analyzing a number of consecutive samples, the most likely sequence can be chosen.

Metric circuit 53 receives the discrete, equalized signal from FIR 48, the clock signal from VFO 52, and threshold values and generates transition signal 56 in response. Metric circuit 53 includes add, compare, select, and store circuitry (ACSS) used to process the discrete values of the discrete, equalized signal and the threshold values and is illustrated more fully in FIG. 3. The threshold value or values may be programmable values that can be provided at a variety of values. These threshold values may be stored in parameter memory 22 as shown in FIG. 1. The threshold values are provided at a positive and a negative value and each are added to the discrete values provided by the discrete, equalized signal resulting in an first sum and a second sum. The first sum and the second sum are then compared, using comparators, to a previously stored metric value. Both comparisons are performed at the same time. The timing of the comparisons are controlled by the clock signal provided by VFO 52. The metric value may be stored and provided by a sample/hold circuit. The results of these two comparisons are a positive transition and a negative transition.

The positive transition and the negative transition are digital signals that serve as transition signal 56 and are provided to trellis circuit 55 and multiplexer 68 through selection circuitry 69. The negative transition is equal to "one" when the comparison of the first sum to the metric value indicates that the first sum is greater than the metric value, and the negative transition is equal to "zero" when the comparison indicates that the first sum is less than the metric value. Similarly, the positive transition is equal to "one" when the comparison of the second sum to the metric value indicates that the second sum is less than the metric value, and the positive transition is equal to "zero" when the comparison indicates that the second sum is greater than the metric value. Whenever either the positive transition or the negative transition is equal to zero, the metric value is reset, for the next comparisons, to a value corresponding to the first sum if the positive transition was equal to zero or to the second sum if the negative transition was equal to zero. This reset metric value is stored in the sample/hold circuit. The positive transition and the negative transition should not both be equal to zero at the same time. Whenever both the positive transition and the negative transition are equal to one, the metric value remains the same for the next comparisons.

Trellis circuit 55 receives transition signal 56 and provides a digital data output signal. Trellis circuit 55 acts as a logic tree or decision tree for sequence decoding of transition signal 56. Trellis circuit 55 provides a digital data output which serves as the digital data output signal of viterbi detector 54. Trellis circuit 55 may be implemented in circuitry using a variety of circuitry such as a series of flip-flops for storing a series of the values provided by transition signal 56.

Multiplexer 68 receives the digital data output signal and transition signal 56 from viterbi detector 54 and provides one of these signals to deserializer 60 depending on whether read channel 18 is in normal mode or defect scan mode. The defect scan control signal at multiplexer 68 determines the mode. During normal mode, multiplexer 68 provides the digital data output signal to deserializer 60. During defect scan mode, the positive transition and the negative transition of transition signal 56 are combined by selection circuitry 69 and provided to multiplexer 68 and then to deserializer 60 and ultimately to control circuitry 11 through data/parameter path 13.

Sync detect 62 receives the digital data output signal from viterbi 54 and provides a synchronization detect signal 70. Sync detect 62 searches for the presence of a synchronization field or synchronization byte in the digital data output signal and enables synchronization detect signal 70 when a synchronization field is detected. Sync detect 62 may search for the synchronization field over a predefined period or "window" of time that the synchronization field should be present. Sync detect 62 may include a register for storing a predefined synchronization field and digital logic circuitry to compare the digital data output to the predefined synchronization field.

Deserializer 60 receives the digital data output signal and provides the digital data output signal in parallel format once sync detect 62 enables synchronization detect signal 70. Deserializer 60 places the digital data in an appropriate parallel format such as an eight or nine-bit format and provides the data to data/parameter path 13.

In operation, read channel 18 receives an analog data signal from disk/head assembly 12 through preamplifier 14 when the RDGATE signal is enabled. The enabling of the RDGATE signal indicates that a read operation is to be performed in read channel 18. Read channel 18 also receives a defect scan control signal at multiplexer 68 indicating whether read channel 18 will operate in normal mode or defect scan mode. VGA 40 receives the analog data signal and provides appropriate gain or boost to the analog data signal which is then filtered by LPF 42. AGC 44 provides a gain signal to VGA 40 to establish the appropriate amplification or gain needed by read channel 18. AGC 44 receives feedback information from error circuit 50 so that appropriate adjustments can be made in the amplification or gain provided to the analog data signal by VGA 40.

Sampler 46, under the control of VFO 52, receives the output signal provided by LPF 42 and samples the signal. Sampler 46 provides a discrete, analog signal to FIR 48. FIR 48 further conditions and equalizes the signal and provides a discrete, equalized signal having the desired channel response for viterbi detector 54. Viterbi detector 54 receives the discrete, equalized signal and analyzes the signal and provides a digital data output signal corresponding to the stored data to multiplexer 68. Viterbi detector 54 also provides an intermediate digital signal, transition signal 56, to multiplexer 68. Multiplexer 68 then provides one of these signals to deserializer 60, depending on whether read channel 18 is operating in normal mode or in defect scan mode as determined by the defect scan control signal provided at multiplexer 68. Transition signal 56 is provided through selection circuitry 69 during defect scan mode and the digital data output signal is provided during normal mode. Deserializer 60 receives one of these signals from multiplexer 68 in response to sync detect 62 detecting a synchronization field or byte in the digital data output signal. Sync detect 62 enables synchronization detect signal 70 which is provided to deserializer 60. Deserializer 60 then provides the digital signal received from multiplexer 68 to data/parameter path 13.

Read channel 18 is operated in defect scan mode to detect any defects or problems in the magnetic storage medium. Defect scan mode is generally performed during manufacture or during the "burn-in" phase so that disk areas with serious defects can be identified and mapped out as available disk storage area. The defects can be caused by any number of reasons and generally indicate that a particular area or sector of the disk is not capable of providing a magnetic field of sufficient strength to indicate the presence of a magnetic transition representing the data that is stored on the disk.

The process for detecting a defect involves first writing known data to the magnetic disks of disk/head assembly 12. This may be accomplished using write channel 16, shown in FIG. 1. The known data to the disks without first encoding the data. The known data may include digital bits all having the same value such as all digital "ones" so that magnetic transitions should be present on the magnetic disks to represent each digital bit. Once the known data is written, a read operation is performed in read channel 18 to read the known data to determine if the magnetic transitions have been properly detected. If a magnetic transition cannot be detected, this signifies the presence of disk defects.

When read channel 18 is operated in defect scan mode, transition signal 56, as provided through selection circuitry 69, serves as the output of read channel 18. The presence of a defect is based on the known data signal or pattern previously written to the disk and its relationship with the magnetic transitions on the disk as indicated by transition signal 56. Transition signal 56 indicates the presence of a transition by providing either the positive transition or the negative transition at a digital "one" value. The threshold values provided to metric circuit 53 may be adjusted to change the point at which a transition is detected which also provides information as to the quality of any defects. The control circuitry may receive transition signal 56 through data/parameter path 13 and process the signal to determine when and where magnetic transitions were detected.

Figure 3:
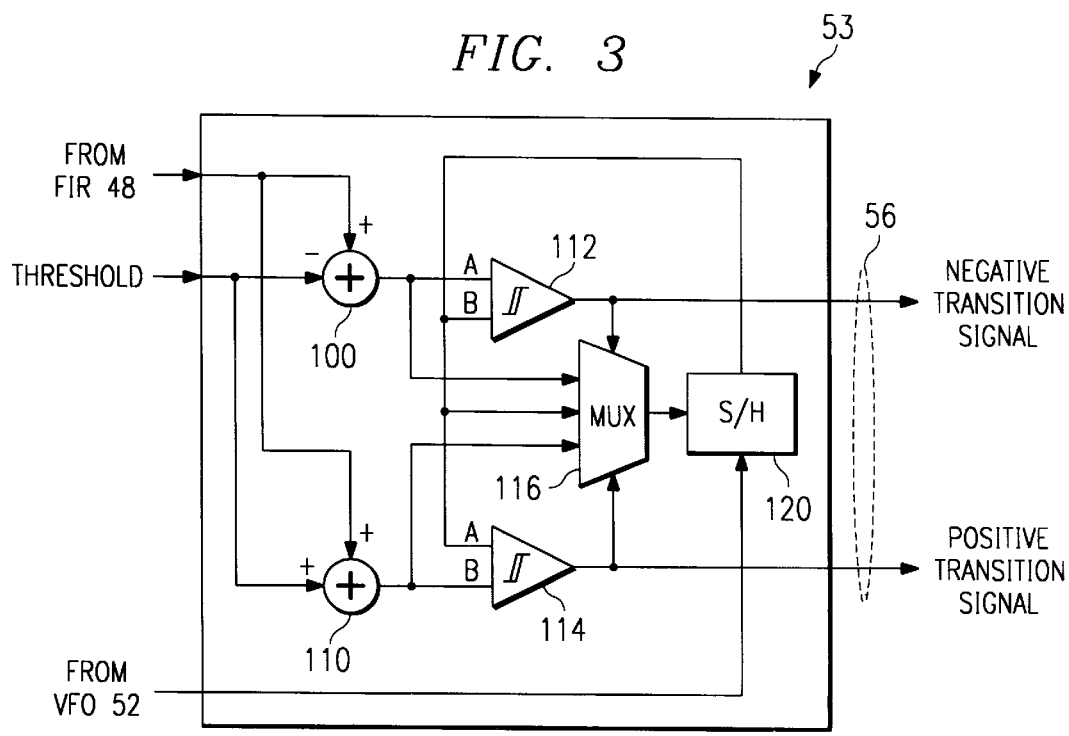
FIG. 3 is a block diagram of the metric circuit of the read channel.

FIG. 3 is a block diagram of metric circuit 53 used in viterbi detector 54. Metric circuit 53 receives the discrete, equalized signal from FIR 48, the clock signal from VFO 52, and a threshold value and generates a transition signal 56 in response. Metric circuit 53 includes a first adder circuit 100 and a second adder circuit 110 that each receive the discrete, equalized signal and the threshold value. First adder circuit 100 subtracts the threshold value from the value of the discrete, equalized signal to generate a first sum. Second adder circuit 110 adds the value of the discrete, equalized signal to the threshold value to generate a second sum.

The first sum is provided as an input to a first comparator 112 and the second sum is provided as an input to a second comparator 114. First comparator 112 and second comparator 114 also receive a metric value as an input. The metric value has been previously stored in a sample/hold circuit 120. Each of these comparators compares its two input values and provides a signal indicating which signal is larger. First comparator 112 generates a negative transition signal as a result of this comparison. The negative transition signal is equal to a digital "one" value when the first sum is greater than the metric value and a digital "zero" value when it is not. Second comparator 114 generates a positive transition signal as a result of its comparison. The positive transition signal is equal to a digital "one" value when the metric value is greater than the second sum and a digital "zero" value when it is not. The timing of each of these comparisons are controlled by the clock signal provided by VFO 52. The combination of the positive transition signal and the negative transition signal serves as transition signal 56.

Whenever either the positive transition signal or the negative transition signal is equal to one, the metric value stored in sample/hold circuit 120 is changed to a new value. When the positive transition signal equals one, the metric value is changed to the first sum. When the negative transition signal is equal to one, the metric value is reset to the second sum. The new metric value is provided through multiplexer 116. If both the positive transition signal and the negative transition signal are equal to zero, the value of the metric value remains the same. The positive transition signal and the negative transition signal should never both be equal to one at the same time.

Multiplexer 116 receives the first sum, the second sum, and the previous metric value as input signals. Multiplexer 116 receives the positive transition signal and the negative transition signal as control signals. Whenever the negative transition signal is equal to one, multiplexer 116 provides the first sum to sample/hold circuit 120. Whenever the positive transition signal is equal to one, multiplexer 116 provides the second sum to sample/hold circuit 120. Otherwise, multiplexer 116 provides the previous metric value back to sample/hold circuit 120.

In operation, the circuitry and operation of metric circuit 53 are controlled by the read clock signal provided by VFO 52. The circuit operations described above are performed each time a discrete value is provided to metric circuit 53 by the discrete, equalized signal of FIR 48. Transition signal 56 is generated as a result of these operations. As discussed previously, transition signal 56 is provided to trellis circuit 56 and to multiplexer 68 through selection circuitry 69 during defect scan mode. Although metric circuit 53 has been illustrated and described with respect to specific circuitry, any of a variety of circuitry may be used to perform the functions of metric circuit 53. For example, the inputs to metric circuit 53 may be digital signals which would then require the use of digital circuitry in metric circuit 53.

Thus, it is apparent that there has been provided, in accordance with the present invention, a detector and method for detecting defects in the magnetic media of a mass storage system that satisfies the advantages set forth above. Although the preferred embodiment has been described in detail, it should be understood that various changes, substitutions, and alterations can be made herein. For example, a variety of different circuitry could be used in the metric circuit and trellis circuit of the detector to perform their specified functions. Also, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention. While the invention has been particularly shown and described by the foregoing detailed description, it will be understood by those skilled in the art that various other changes in form and detail may be made without departing from the spirit and scope of the invention as defined by the following claims.

What is claimed is:

1. A detector for providing a transition signal to indicate a defect comprising:

a metric circuit operable to receive a discrete, equalized signal and to generate the transition signal in response, the metric circuit operable to provide the transition signal to indicate the defect as an output of the detector;

a trellis circuit operable to receive the transition signal to indicate the defect and to perform sequence decoding, the trellis circuit operable to provide a digital data output signal in response;

wherein the metric circuit comprises a first adder circuit operable to add a positive threshold value to the discrete, equalized signal and to generate a first sum in response;

a second adder circuit operable to add a negative threshold value to the discrete, equalized signal and to generate a second sum in response;

a first comparator operable to compare the first sum and a current metric value and to generate a positive transition signal in response;

a second comparator operable to compare the second sum and the current metric value and to generate a negative transition signal in response; and a sample/hold circuit operable to receive the positive transition signal and the negative transition signal and to provide the current metric value, the sample/hold circuit operable to update the current metric value with the first sum if the positive transition signal indicates that the first sum is less than the current metric value and to update the current metric value with the second sum if the negative transition signal indicates that the second sum is greater than the current metric value.

2. The detector of claim 1 wherein the transition signal to indicate the defect includes the positive transition signal and the negative transition signal.

3. The detector of claim 1 wherein the positive threshold value and the negative threshold value are programmable values that can be provided over a range of values.

4. A synchronously sampled data channel comprising:

a write channel operable to receive and process a digital data signal during a write operation and to generate a write signal in response;

a read channel operable to receive and process a read signal during a read operation, to operate in a normal mode and a defect scan mode, and to generate a digital data output signal in response, the read channel including a detector operable to generate a transition signal as an output;

wherein the detector comprises:

a metric circuit operable to receive a discrete, equalized signal from the read channel and to generate a transition signal, the metric circuit operable to provide the transition signal as an output; and a trellis circuit operable to receive the transition signal and to perform sequence decoding, the trellis circuit operable to provide the digital data output signal;

wherein the metric circuit comprises:

a first adder circuit operable to add a positive threshold value to the discrete, equalized signal and to generate a first sum signal in response;

a second adder circuit operable to add a negative threshold value to the discrete, equalized signal and to generate a second sum signal in response;

a first comparator operable to compare the first sum signal and a current metric value and to generate a positive transition signal in response;

a second comparator operable to compare the second sum signal and the current metric value and to generate a negative transition signal in response; and a storage circuit operable to receive the positive transition signal and the negative transition signal and to provide the current metric value, the storage circuit operable to update the current metric value with the first sum signal if the positive transition signal indicates that the first sum signal is less than the current metric value, the storage circuit operable to update the current metric value with the second sum signal if the negative transition signal indicates that the second sum signal is greater than the current metric value.

* * * * *